April 29, 1924.

F. CALDWELL

GRADOMETER

Filed Jan. 4, 1922

Inventor.
Felix Caldwell.
By A. Singer. Atty.

April 29, 1924.

F. CALDWELL

GRADOMETER

Filed Jan. 4, 1922  2 Sheets-Sheet 2

1,492,156

Inventor
Felix Caldwell,
By B. Singer,
Atty.

Patented Apr. 29, 1924.

1,492,156

UNITED STATES PATENT OFFICE.

FELIX CALDWELL, OF COOGEE, NEW SOUTH WALES, AUSTRALIA.

GRADOMETER.

Application filed January 4, 1922. Serial No. 526,977.

*To all whom it may concern:*

Be it known that I, FELIX CALDWELL, a subject of the King of Great Britain and Ireland, residing at 201 Belmore Road, Coogee, in the State of New South Wales, Commonwealth of Australia, have invented certain new and useful Improvements in Gradometers, of which the following is a specification.

This invention relates to the visible indication of the grade up or down on which a vehicle such as an automobile or train is travelling or standing, on which an aircraft is travelling, or the extent to which a ship is rolling or pitching.

Instruments for indicating inclination are known and a known type includes a dial having a graduated scale, a pendulum, a pointer movable along said scale, and link and lever gearing between said pendulum and pointer whereby the latter is deflected to one side or the other of a neutral point indicating level on the scale, according to whether the grade be up or down. In these instruments as hitherto constructed the pointer deflection is proportionate to the angular variation between the pivotal centre line of the pointer and the axial line of the vertically hanging pendulum.

When such an instrument is level the said angle is 90 degrees, but on a grade of 1 in 80 the angle is varied to the extent of approximately 43 minutes only, while if the grade be increased to 1 in 60 the variation is increased by approximately 14 minutes only. On the other hand, on the steeper grades say 1 in 6 the said angle is approximately 9 degrees 6 minutes, between 1 in 6 and 1 in 5 the variation is approximately 2 degrees 13 minutes, and between 1 in 5 and 1 in 4 the variation is 2 degrees 43 minutes.

It will thus be seen that if the pointer deflection is proportionate to the grade, the deflection due to a grade of 1 in 80 or even 1 in 60 will be too small to be easily perceptible unless the pointer is of very considerable length and the dial inconveniently large, and that if the deflection due to all grades be amplified so that a shorter pointer may be used, then the length of the scale must be inconveniently long in order to accommodate the widely spaced graduations indicating the steeper grades.

The object of my invention is to provide a gradometer of convenient size which does not have the beforementioned disadvantages, and in which the pointer deflections due to such light grades as 1 in 60 or 1 in 80 are not materially less than that due to a variation in grade of from 1 in 5 to 1 in 4.

A subsidiary object of my invention is to provide a gradometer which will be practically unaffected by road inequalities or shocks or momentary variations of grade or inclination.

My invention consists primarily in a gradometer in which the angular deflection of the pointer due to the lighter grades is amplified, such amplification gradually disappearing as the pointer indicates the steeper grades.

My invention also consists in a gradometer which includes the parts hereinbefore mentioned, a container in which the pendulum is housed and which contains a viscous fluid such as glycerine, and a casing on the axial line of which the pointer is pivoted, and in which an arm maintained in fixed relation to the pointer and pivoted concentrically therewith, is slidably engaged by a swinging end of a pivoted rocking lever actuated by link and lever mechanism from the axis from which the pendulum is suspended.

My invention further consists in a gradometer comprising such novel features and combination of parts as will be understood from the following description and accompanying drawings of a gradometer constructed according to this invention.

In the drawings—

Fig. 1 is a front elevation of the instrument,

Fig. 2 a side elevation of the same attached to a board such as the instrument board of an automobile, and Fig. 3 a view in plan of part of the dial and the front of the container and also showing the mechanism in corresponding disposition.

Figure 1:
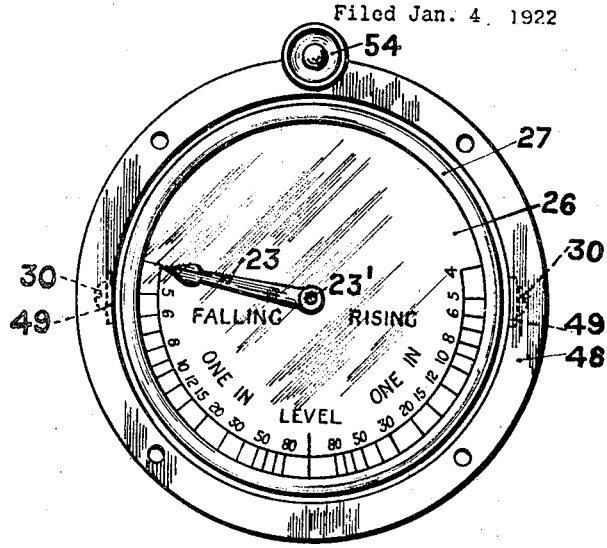
Figure 2:
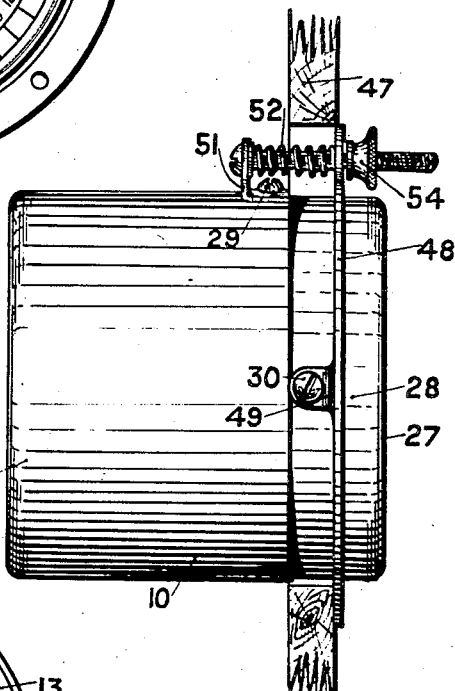
Figure 3:
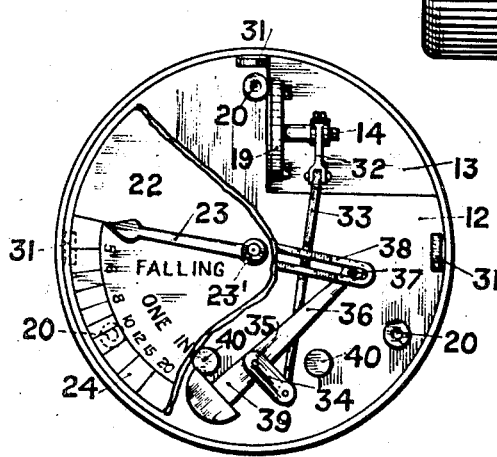
Figure 4:
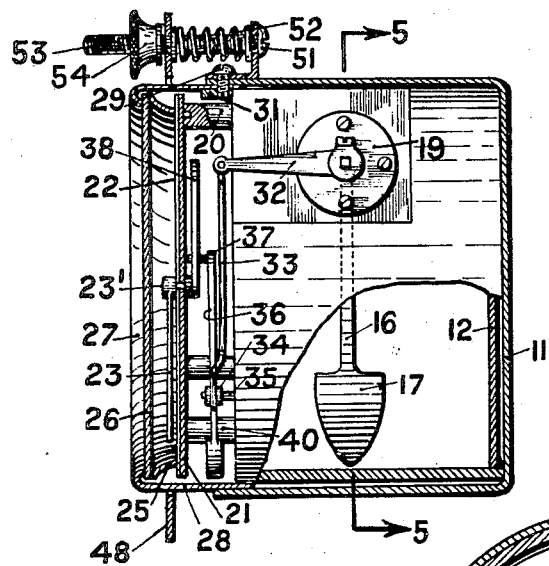
Fig. 4 is a side view showing the casing in section and part of the wall of the container cut away.

In the main part 10 of the cylindrical casing which has a closed end 11, is housed the generally cylindrical container 12 having a segmental recess 13.

A spindle 14 passes through the vertical wall of said recess 13, and on the inner end of said spindle there is affixed by screw 15 the pendulum 16 of similar form to the interior sectional contour of the container 12 and weighted at its lower end as shown at 17. Leakage of the viscous fluid in the container is prevented by means of a leather washer 18 closely fitting about the spindle 14 and held against the exterior face of the vertical wall of recess 13 by a washer 19 screwed to said wall.

Studs 20 projecting from the front of the container, support a dial plate 21 on which is a dial 22. Centrally pivoted at 23′ in said dial plate is a pointer 23 movable over the scale 24 of the dial as hereinafter explained. Said scale is graduated in appropriate terms as shown and it will be seen that there is practically as much space between the graduation mark indicating level and that indicating the very light grade of 1 in 80 as there is between the marks indicating respectively the steeper grades of 1 in 5 and 1 in 4.

On the face of the dial is a ring 25 and against this is a disc of glass 26, and these parts are held in proper fixed relation against the studs 20 by the inturned end 27 of the complementary part 28 of the casing, which part telescopes into the end of the main part 10 and is held by means of a top screw 29 and on each side by a screw 30. All of said screws pass through both parts of the casing and engage lugs 31 on the front of the container. All the parts are thus held in proper relation, and for positioning the dial plate small pintles 32 thereon engage respectively recesses in the studs 20.

The angular movement of the pointer 23 as the axis of the instrument inclines from the horizontal is effected by link and lever mechanism as follows:—

On the outer end of spindle 14 there is mounted a lever 32 connected at its swinging end to a link 33 which at its other end is connected to one arm 34 of a bell crank lever pivoted at 35 on the face of the container and on the same vertical line as the pointer. The other arm 36 of the bell crank lever carries a pintle 37 which engages in a longitudinal slot in a lever 38 mounted concentrically with the pointer 23 and in fixed diametrically opposite relation thereto. A weighted tail piece 39 extends from the bell crank lever to balance the parts, said tail piece oscillating between stops 40 on the front of the container.

Figure 7:
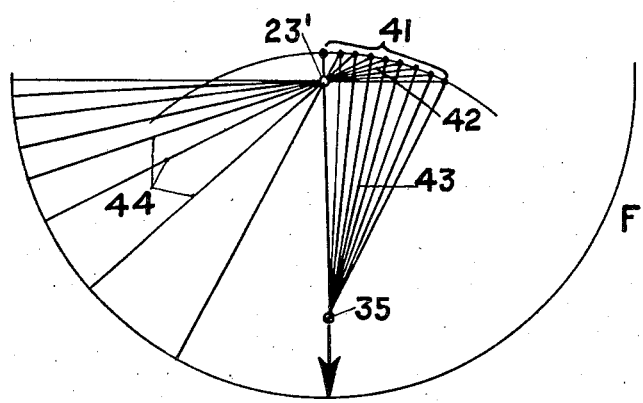
Fig. 7 is a diagrammatic view to a slightly larger scale depicting the relative disposition of parts for different grades, and illustrating the amplification of pointer movement and diminution thereof.

When the axial line of the instrument is level it is at a definite predetermined angle to the lever 32 conveniently parallel to it as shown, and the slotted lever and pointer are vertical. By angular adjustment of lever 32 on spindle 14 the other parts may be so arranged that the plane of the dial may be horizontal or at any angle thereto. The respective lengths of lever 32 crank arm 34 and crank arm 36 being in the approximate ratio 3, 1, 3, apparent chordal movement of the swinging end of lever 32 results in a chordal movement of pintle 37 of three times the extent. In reality it is the casing and contained parts of the instrument other than the pendulum and lever 32, which move, the later elements tending to remain vertical and horizontal respectively. The consequent movement of the swinging end of the pointer is further amplified in the ratio of the respective lengths of the pointer and the distance from the pivotal point of lever 38 to the position of the pintle 37 therein. This amplification is at first considerable, that is to say from the level indicating position of the pointer, to other positions indicating light grades, but as the lever 38 assumes an angular position the pintle moves further away from the pivotal point of said lever, and the difference between its distance from the pivotal point 23′ and the length of pointer 23 gradually diminishes and consequently the amplification diminishes. This is very clearly shown in Fig. 7 in which various angular positions of equal difference of the pintle 37 are indicated generally by the numeral 41, lines 42 indicate corresponding positions of the lever 38, lines 43 of the crank arm 36, and lines 44 of the pointer 23. It will be seen that movement of the pintle 37 from the normal or vertical position to the first indicated position on the right, moves the pointer to the left to an extent about eight times greater than the angular movement of the pintle, while on further successive but equal movements of the pintle the amplification of the angular movement of the pointer becomes gradually less. It will be remembered however, that the apparent angular movement of lever 32 and consequently of crank arm 36 increases as the grades increase and that therefore though the amplification of the pointer movement may diminish the actual movement thereof is not proportionately diminished in respect of the steeper grades.

For the purpose of mounting the instrument in an aperture in a board such as 47 and permitting adjustment thereof, I provide a ring plate 48 encircling the casing and having integral angular lugs 49 through which pass the screws 30. Said screws thus constitute trunnions in addition to their other function before described.

Figure 6:
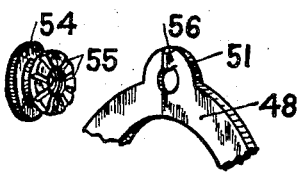
Fig. 6 is a detail of portion of adjusting means for the instrument.
Figure 5:
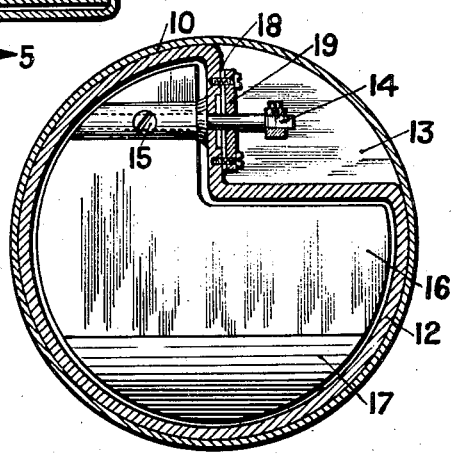
Fig. 5 is a sectional elevation on line 5. 5. of Fig. 4.

At the top, said ring plate has a radial lug 50 juxtaposed to an angle lug 51 secured to the casing by the before mentioned screw 29. Between said lugs is a coil spring 52 tending to force them apart, and passing through both lugs and the spring is a bolt 53 fitted with a nut 54. On the bearing face of this nut are radial grooves 55 any one of which engages an excrescence 56 on the opposing face of lug 50 (see Fig. 6) thus preventing the nut from slacking back. The ring plate 48 being affixed by screws to the board 47 adjustment of the instrument to level it is effected by screwing nut 54 so as to vary as required the angular relation between the axial line of the instrument and the plane of the ring plate 48.

The fact that the contour of the pendulum accords with that of the interior section of the container and that only a small space is provided for the passage of the viscous fluid from one side of the pendulum to the other, has a damping effect which minimizes the effect on the pendulum of jolts or momentary variations of grade so that the pointer is not materially affected by same.

In the embodiment of my invention which I have illustrated, the plane of the dial is parallel to the axis on which the pendulum swings, but where the place of installation requires it or renders it preferable I may so arrange the parts that the plane of the dial is at right angles or otherwise disposed to the axis of the pendulum.

What I claim and desire to secure by Letters Patent is:—

1. In a gradometer which includes a dial, a graduated scale thereon, a pointer, a casing and a pendulum, the combination with said elements of an arm pivoted concentrically with said pointer and maintained in fixed angular relation thereto, a lever pivoted to said casing, means whereby said lever has sliding engagement with said arm, and means to impart angular movement to said lever.

2. A gradometer comprising in combination, a casing, a dial having a scale thereon, a pivoted pointer moving along said scale, a pendulum, an arm pivoted concentrically with the pointer and in fixed angular relation thereto, a lever pivoted to said casing, the swinging end of said lever having sliding engagement with said arm, and means connecting said lever to said pendulum for movement by the latter.

3. A gradometer comprising in combination, a casing, a container therein for viscous fluid, a pendulum in said container, a spindle passing through the wall of said container and on which said pendulum is hung, a lever on the outer end of said spindle and held in fixed angular relation to said pendulum, a dial having a scale thereon, a pivoted pointer moving along said scale, a bell crank lever pivoted to said casing, a connecting link between the first mentioned lever and one arm of the bell crank lever, a pintle on the swinging end of the other arm of the bell crank lever, and an arm having a longitudinal slot with which said pintle engages, said last mentioned arm being pivoted concentrically with the pointer and disposed in fixed angular relation thereto.

4. In a gradometer which includes a casing, a pendulum therein, a dial having a graduated scale thereon, and a pointer moving over said scale, pointer actuating mechanism comprising an arm held in fixed angular relation to said pendulum, a bell crank lever pivoted to said casing, a connecting link between the first mentioned lever and one arm of the bell crank lever, a pintle on the swinging end of the other arm of the bell crank lever, and an arm having a longitudinal slot with which said pintle engages, said last mentioned arm being pivoted concentrically with the pointer and disposed in fixed angular relation thereto.

5. A gradometer including a cylindrical casing mounted in a fixed ring, and provided with means for adjusting the vertical angle between the axis of the casing and the plane of said ring, said means comprising a lug on the casing, a bolt passing through said lug and ring, a spring about said bolt tending to separate said lug and ring, and a nut on said bolt whereby the tension of the screw is regulated.

Signed at Sydney, N. S. W., this first day of December, A. D. 1921.

FELIX CALDWELL.